United States Patent Office 3,558,587
Patented Jan. 26, 1971

3,558,587
THREE-COMPONENT CATALYTIC SYSTEM INCLUDING A HYDROCARBYL SILANE
John W. Bayer and Edgardo Santiago, Toledo, Ohio, assignors to Owens-Illinois, Inc., a corporation of Ohio
No Drawing. Continuation-in-part of application Ser. No. 306,329, Sept. 3, 1963. This application Jan. 26, 1968, Ser. No. 700,744
Int. Cl. C08f 1/56, 3/02
U.S. Cl. 260—93.7                                    4 Claims

ABSTRACT OF THE DISCLOSURE

This invention relates to the polymerization of olefins by using a three-component catalytic system containing $VCl_3$ or titanium tetrachloride or titanium trichloride, an organoaluminum compound such as triethylaluminum and an organosilane selected from the group consisting of triethylsilane, triphenylsilane, diphenylsilane, and tri-n-hexylsilane. The aforementioned organosilanes contain at least one silicon-hydrogen bond and are used such that the ratio of the number of silicon atoms to the number of aluminum atoms are 0.78–3.26 in a $VCl_3$ catalyst and 1.73–2.13 in a titanium trichloride or tetrachloride catalyst, and the number of vanadium or titanium atoms are present in a ratio of 0.95–1.09 in a vanadium catalyst and 1.02 to 1.09 in a titanium catalyst relative to the total number of aluminum and silicon atoms.

RELATED APPLICATIONS

This invention is a continuation-in-part of copending U.S. patent application Ser. No. 306,329, filed Sept. 3, 1963 and now abandoned.

THE INVENTION

This invention relates to a catalyst and process for polymerization of olefins. In particular, this invention relates to a polymerization catalyst which comprises a Ziegler catalyst system plus an organosilane in which at least one hydrogen atom is bonded directly to silicon, and to a process of polymerizing olefins with this catalyst.

The addition of triethylaluminum to a heptane solution of titanium tetrachloride causes formation of a brown-black precipitate which consists mainly of reduced titanium chlorides; the precipitate and supernate catalyze the low pressure polymerization of many alpha-olefins. This important discovery by Karl Ziegler was reported in Belgian Pat. 533,362 (1954), which disclosed catalysts prepared by interaction of a trialkylaluminum with a compound of a metal from Group IV–B, V–B, or VI–B of the Periodic Table, including thorium and uranium. The basic Ziegler method was subsequently expanded by many workers, particularly Natta et al., to include preparation of highly linear and often stereoregular polymers of high molecular weight from a wide variety of alpha-olefins. Application of these processes to monosubstituted ethylenes provides polymers which possess tertiary asymmetric carbon atoms. If these asymmetric centers have the same steric configuration, at least for long portions of the chain, the polymer is said to be isotatic; if the asymmetric carbon atoms alternate in configuration, the polymer is syndiotactic; and if the asymmetric arrangement is random, the polymer is atactic. The terms Ziegler Catalyst and Ziegler Process are generically to compositions and procedures which broadly resemble those discovered by Ziegler. The reported variations of the basic concept are too diverse to be suceptible to concise summary, but the majority of important Ziegler catalysts are encompassed in the definition of a catalyst system which contains (a) a compound, usually a halide or ester, of a transition metal from Group IV, V, or VI of the Periodic Chart, and (b) a compound of the formula $RMX_y$, where R represents an aryl or alkyl radical, M represents a metal atom from group I, II, or III, X represents a halogen atom or an alkoxy radical, and y represents an integer less than the oxidation state of M.

In the practice of this invention it has been discovered that addition of an organosilane which contains at least one silicon-hydrogen bond per molecule to the aforementioned prior art Ziegler systems provides a catalyst composition(s) with improved catalytic properties.

More particularly, in accordance with this invention it has been discovered that the yield in an olefin polymerization process can be substantially increased, typically by a factor of at least 1.5 to 2.5, by a catalyst composition consisting essentially of titanium or vanadium atoms in the form of titanium halide or $VCl_3$, aluminum atoms in the form of an organoaluminum, and silicon atoms in the form of an organosilane containing at least one silicon-hydrogen bond per molecule, the ratio of the number of silicon atoms to the number of aluminum atoms being at least about 1.5 in a titanium system and at least about .7 in a vanadium system, and the titanium or vanadium atoms being present in a catalytic amount.

In a preferred embodiment hereof, the ratio of silicon atoms to aluminum atoms is at least about 1.7 and the number of titanium or vanadium atoms ranges from about 0.8 to 1.5 times the total number of aluminum and silicon atoms.

The required total amount of the catalyst composition will, of course, be a function of the olefin and the amount thereof to be polymerized whether on a continuous or batch basis; that is, the composition must be used in a catalytic amount relative to the particular process conditions.

According to the present invention there is provided a catalyst system which consists essentially of (A) a compound selected from the group which consists of $VCl_3$ and $TiX_n$, where X represents a halogen atom with atomic number greater than 16, and n is 2, 3, or 4; (B) a compound of the formula

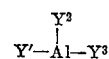

where Y′ represents a radical selected from the group which consists of alkyl radicals with less than five carbon atoms and the phenyl radical, $Y^2$ represents a radical selected from the group which consists of alkyl radicals with less than five carbon atoms, the phenyl radical, a chlorine atom, and a bromine atom, and $Y^3$ represents a radical selected from the group which consists of alkyl radicals with less than five carbon atoms, the phenyl radical, a chlorine atom, and a bromine atom; and (C) a compound of the formula

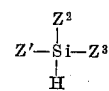

where Z′ represents a radical selected from the group which consists of alkyl radicals with less than seven carbon atoms and aryl radicals with less than ten carbon atoms, $Z^2$ represents a radical selected from the group which consists of alkyl radicals with less than seven carbon atoms, aryl radicals with less than ten carbon atoms, and a hydrogen atom, and $Z^3$ represents a radical selected from the group which consists of alkyl radicals with less than seven carbon atoms, aryl radicals with less than ten carbon atoms, and a hydrogen atom. A further aspect of this invention provides a method for polymerization which comprises contacting an olefin with a catalyst system of the type just described.

Examples of compounds of the formula $TiX_n$ as defined above are titanium dichloride, titanium trichloride, titanium tetrachloride, titanium tribromide, titanium tetrabromode, titanium triiodide, and titanium tetraiodide.

In the definition of a compound of the formula $$AlY'Y^2Y^3$$

above (hereafter referred to generically as $AlY_3$), the term alkyl radical with less than five carbon atoms refers to a radical whose formula can be derived by omitting the symbol for one hydrogen atom from the formula for a saturated, acylic hydrocarbon which contains from one to four carbon atoms. Examples of compounds of the formula $AlY_3$ so defined are trimethylaluminum, methylaluminum dibromide, triethylaluminum, diethylaluminum chloride, tri-n-propylaluminum, n-propylaluminum dibromide, triisopropylaluminum, diisopropylaluminum chloride, tri-n-butylaluminum, n-butylaluminum dichloride, triphenylaluminum, diphenylaluminum bromide, phenylmethylaluminum chloride, and phenylethylaluminum bromide.

In the definition of a compound of the formula $$HSiZ'Z^2Z^3$$

above (hereafter referred to generically as $HSiZ_3$), the term alkyl radical with less than seven carbon atoms refers to a radical whose formula can be derived by omitting the symbol for one hydrogen atom from the formula for a saturated, acyclic hydrocarbon which contains from one to six carbon atoms; the term aryl radical with less than ten carbon atoms refers to a radical whose formula can be derived by omitting the symbol for one hydrogen atom attached to a benzene ring in the formula for benzene or its hydrocarbon derivatives which contain from six to nine carbon atoms. Examples of compounds of the formula $HSiZ_3$ so defined are methylsilane, trimethylsilane, diethylsilane, triethylsilane, tri-n-propylsilane, isopropylsilane, di-n-butylsilane, sec-butylsilane, di-n-pentylsilane, triisoamylsilane, tri-n-hexylsilane, di-n-hexylsilane, triphenylsilane, diphenylsilane, phenylsilane, di-p-tolylsilane, tri(2,4 - dimethylphenyl)silane, ethylisopropylsilane, and phenyldimethylsilane.

In a usual embodiment of this invention there is provided a catalyst system which consists essentially of (A) a compound of the formula $TiX_n$ as previously defined; (B) a compound of the formula

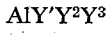

where each $Y'$ and $Y^2$ independently has the meaning already assigned; and (C) a compound of the formula

where each $Z'$ independently has the meaning already assigned. A further usual aspect provides a method for polymerization which comprises contacting an alpha-olefin with a catalyst system of the type just described in a hydrocarbon medium.

In a preferred embodiment of the present invention, there is provided a catalyst system which consists essentially of (A) a compound of the formula $TiX_n$ as previously defined; (B) a compound of the formula

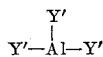

where each $Y'$ independently has the meaning already assigned; and (C) a compound of the formula

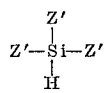

where each $Z'$ independently has the meaning already assigned.

A further preferred aspect provides a method for polymerization which comprises contacting an alpha-olefin with a catalyst system of the type just described in a hydrocarbon medium.

In a particularly preferred embodiment of this invention, there is provided a catalyst system which consists essentially of (A) a compound of the formula $TiX_n$ as previously defined, (B) a compound of the formula

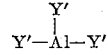

where each $Y'$ independently has the meaning already assigned; and (C) triethylsilane.

A further particularly preferred aspect provides a method for polymerization which comprises contacting ethylene or propylene with a catalyst system of the type just described in heptane at a temperature above room temperature and below the boiling point of the reaction mixture at atmospheric pressure.

It is also within the purview of this invention to add a Lewis acid, particularly aluminum chloride, to the polymerization medium to increase the effectiveness of the catalyst system, and to provide two or more olefinic monomers in order to obtain copolymers.

Materials which are polymerized in accordance with the present invention are, broadly, organic monomers which contain an ethylenic linkage including olefins. The method of this invention is especially useful when applied to olefins which contain at least one terminal double bond. The olefinic hydrocarbons most preferred are 1-monoolefins which contain two to ten carbon atoms per molecule. In particular, ethylene can be rapidly polymerized to a tough, solid polymer upon being contacted with a catalyst of this invention at mild temperatures and low pressures; the resultant products generally have high melting points and high densities. Examples of other suitable olefins are propylene, 1-butene, 1-pentene, 1-hexene, 1-heptene, 1-octene, and 1-decene. Examples of branched chain olefins are 3-methyl-1-pentene, 3-methyl-1-butene, 4-methyl-1-pentene, and 4,4-dimethyl-1-pentene. Examples of di- and polyolefins include 1,3-butadiene, isoprene, 2,3-dimethyl-butadiene, 2-phenyl-1,3-butadiene, 1,5-hexadiene, 1,4-pentadiene, 1,4,7-octatriene, 2-methyl-1,3-butadiene, 2-methyl-1,3-pentadiene, 2,3-dimethyl-1,3-pentadiene, 2-methyl-3-ethyl - 1,3 - pentadiene, and 1,4,6-trimethyl-1,5-hexadiene. Other olefinic compounds useful in the present process include styrene, alpha-methylstyrene, vinylcyclohexane, cyclopentadiene, allylbenzene, and allylcyclohexane. Examples of non-hydrocarbon monomers include chloroprene, 2-methoxybutadiene, methyl acrylate, methyl methacrylate, vinyl chloride, vinyl acetate, 2-methyl-5-vinylpyridine, 4-vinylpyridine, and 2-vinylpyridine.

As noted hereinbefore, it has been discovered in the practice of this invention that the use of an organosilane containing at least one silicon-hydrogen bond produces a synergistic effect in polymer yield particularly when the silane is used in an amount sufficient to provide a certain ratio of silicon atoms to aluminum atoms. This synergistic effect, as shown in the following examples, is illustrated by comparison of the yields from reactions of four types:

(A) A reaction in which a conventional Ziegler system, e.g., $Y_3Al$ and $TiX_n$, is used to polymerize an olefin;

(B) A reaction in which the $Y_3Al$ of the conventional Ziegler system is completely replaced by an equimolar quantity of $HSiZ_3$ compound; and (C) A reaction in which part of the $Y_3Al$ compound of the conventional Ziegler system is replaced by an equimolar portion of $HSiZ_3$ compound.

(D) A reaction in which part of the $Y_3Al$ compound of reaction C is replaced by the $HSiZ_3$ compound of reaction C in an amount sufficient to provide a ratio of silicon to aluminum of at least 1.5 in a titanium system and at least .7 in a vanadium system.

In each instance, it is found that the yield from reaction D (where present) is greater than that from either A, B, or C indicating that the effect of a minimum partial replacement of $Y_3Al$ by $HSiZ_3$ is unexpectedly able to increase yield more than additively.

In the experiments which correspond to the following specific examples, normally liquid silanes were commercial materials which were distilled to give a fraction which boiled over a temperature range of not more than 3° C. This fraction was then stored under nitrogen in containers equipped with rubber stoppers to allow insertion of a hypodermic needle so that the silanes could be transferred to the reaction mixture by means of a syringe.

The titanium trichloride was an anhydrous, purple, crystalline material sealed in 0.2 gram quantities in individual ampoules in a nitrogen atmosphere, and was obtained from the Anderson Chemical Division of the Stauffer Chemical Company; it was introduced into the reaction vessel by means which excluded contact with air. Heptane was carefully purified and dried before use, and was transferred to the reaction vessel in a nitrogen atmosphere. High purity ethylene was also employed, and was carefully further purified immediately before use.

The reaction vessel was a 1-liter round bottom flask equipped with a side arm and a thermowell containing a thermocouple attached to an automatic temperature recorder; the flask was mounted in a heating mantle controlled by a variable transformer. The reaction vessel was shaken by means of a mechanical shaker applied throughout the reaction time. Gaseous monomers were continuously introduced into the reaction vessel so as to maintain pressures in most cases in the range from 20 to 25 p.s.i.g., as indicated in the examples.

The samples of polymer prepared by the methods of the following examples were, after the workup procedure described, dried at 60–70° C. under reduced pressure, and then compression molded into films at 240° C. under a pressure of about 10,000 p.s.i. A small portion of a three-mil film thus prepared was placed between glass plates on a Fischer-Johns melting point apparatus, and a melting range was determined as the temperature at which clearing of the polymer began and the temperature at which further clearing ceased. The remainder of the three-mil film was submitted for infrared analysis. A ten-mil film similarly prepared was subjected to a modification of the ASTM–762–60T procedure for determination of density. Densities were determined at 23° C. The solid polymers produced by the method of this invention are useful for making articles such as bottles, bowls, pails, etc. Liquid and soft polymers can be used as rubber plasticizers, plasticizers for organic plastics, as caulking compounds, etc.

EXAMPLE 1

(A) In the reaction vessel of the apparatus previously described were placed 300 ml. of purified heptane, 0.5 gram of titanium trichloride, and 0.44 ml. of triethylaluminum. The mixture thus obtained was heated under a nitrogen atmosphere with shaking to 57° C., whereupon the nitrogen blanket was replaced by propylene maintained at a pressure of 20 p.s.i.g. The mixture was heated with agitation at about 57° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The polymer yield was 40.6 g.; the product has a melting point of 132–155° C., and a density of 0.902 gram per cubic centimeter.

(B) The procedure of Example 1A was repeated, except that 0.61 ml. of triethylsilane was substituted for the triethylalumium therein described. The yield of the product polymer was 1.2 grams; its melting point was 130–150° C., and its density was 0.891 gram per cubic centimeter.

(C) The procedure of Example 1A was repeated, except that 0.14 ml. of triethylaluminum and 0.34 ml. of triethylsilane were substituted for the triethylaluminum therein described. The yield of the product polymer was 46.4 grams. Its melting point was 116–154° C., and its density was 0.894 gram per cubic centimeter. The infrared spectra of the products of Examples 1A, 1B, and 1C were essentially superimposable, and were identical with that for highly linear polypropylene.

EXAMPLE 2

(A) In the reaction vessel of the apparatus previously described were placed 300 ml. of purified heptane, 0.6 ml. of titanium tetrachloride, and 0.74 ml. of triethylaluminum. The mixture thus obtained was heated under a nitrogen atmosphere with shaking to 57° C. whereupon the nitrogen blanket was replaced by ethylene maintained at a pressure of 20 p.s.i.g. The mixture was heated with agitation at about 57° C. for about two hours, and then allowed to cool to about room temperature. To the resultant mixture was added 500 ml. of 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The polymer yield was 15.9 grams. The melting range began at 101° C. under slight mechanical pressure, and the density was 0.954 gram per cubic centimeter.

(B) The procedure of Example 2A was repeated, except that 0.75 ml. of triethylsilane was substituted for the triethylaluminum therein described; no polymer was obtained.

(C) The procedure of Example 2A was repeated, except that 0.49 ml. of triethylaluminum and 0.25 ml. of triethylsilane were substituted for the triethylaluminum therein described. The yield of the product polymer was 16.0 grams. The melting range began at 95° C. under slight mechanical pressure, and the density was 0.954 gram per cubic centimeter.

(D) The procedure of Example 2A was repeated, except that 0.25 ml. of triethylaluminum and 0.5 ml. of triethylsilane were substituted for the triethylaluminum therein described. The yield of the product polymer was 31.1 grams. The melting range began at 95° under slight mechanical pressure, and the density was 0.954 gram per cubic centimeter. The infrared spectra of the products of Examples 2A, 2C, and 2D were identical with that for highly linear polyethylene.

EXAMPLE 3

(A) In the reaction vessel of the apparatus previously described were placed 300 ml. of purified heptane, 0.6 ml. of titanium tetrachloride, and 0.74 ml. of triethylaluminum. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 57° C. for about two hours, and then allowed to cool to about room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60–70° C under a slightly subatmospheric pressure. The yield of polymer was 11.9 grams. The product had a melting point of above 80° C. under slight mechanical pressure, and a density of 0.35 gram per cubic centimeter.

(B) The procedure of Example 3A was repeated, except that 1.86 ml. of tri-n-hexylsilane was substituted for the triethylaluminum therein described. No polymer was obtained.

(C) The procedure of Example 3A was repeated, except that 0.49 ml. of triethylaluminum and 0.62 ml. of tri-n-hexylsilane wer substituted for the triethylaluminum therein described. The yield of the product polymer was 14.6 grams. The melting point of the polymer thus obtained was above 94° C. under slight mechanical pressure, and the density was 0.948 gram per cubic centimeter.

(D) The procedure of Example 3A was repeated, except that 0.25 ml. of triethylaluminum and 1.24 ml. of tri-n-hexylsilane were substituted for the triethylaluminum therein described. The yield of the product polymer was 29.7 grams. The melting point of the polymer thus obtained was above 93° C. under slight mechanical pressure, and its density was 0.951 gram per cubic centimeter. The infrared spectra of the products of Examples 3A, 3C, and 3D were essentially superimposable, and were identical with that for highly linear polyethylene.

EXAMPLE 4

(A) In the reaction vessel of the apparatus previously described were placed 300 ml. of purified heptane, 0.5 gram of titanium trichloride, and 0.44 ml. of triethylaluminum. The mixture thus obtained was heated under a nitrogen atmosphere with shaking to 57° C., whereupon the nitrogen blanket was replaced by propylene maintained at a pressure of 20 p.s.i.g. The mixture was heated with agitation at about 57° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The yield of polymer was 26.8 grams. The product had a melting point of 145–188° C. and a density of 0.891 gram per cubic centimeter.

(B) The procedure of Example 4A was repeated, except that 0.61 ml. of diphenylsilane was substituted for the triethylaluminum therein described. The yield of the product polymer was 0.87 gram. The product thus obtained had a melting point of 145–180° C. and a density of 0.899 gram per cubic centimeter.

(C) The procedure of Example 4A was repeated, except that 0.14 ml. of triethylaluminum and 0.2 ml. of diphenylsilane were substituted for the triethylaluminum therein described. The yield of the product polymer was 27.5 grams. The polymer thus obtained had a melting point of 148–179° C. and a density of 0.895 gram per cubic centimeter.

(D) The procedure of Example 4A was repeated, except that 0.14 ml. of triethylaluminum and 0.4 ml. of diphenylsilane were substituted for the triethylaluminum therein described. The yield of the product polymer was 41.4 grams; its melting point was 152–176° C. and its density was 0.889 gram per cubic centimeter. The infrared spectra of the products of Examples 4A, 4B, 4C, and 4D were essentially superimposable, and were identical with that for highly linear polypropylene.

EXAMPLE 5

(A) In the reaction vessel of the apparatus previously described were placed 300 ml. of purified heptane, 1.0 gram of vanadium trichloride, and 0.82 ml. of triethylaluminum. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 57° C. for two hours, and then allowed to cool to about room temeprature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° under a slightly subatmospheric pressure. The polymer yield was 1.4 grams; its melting point was 105° C. under slight mechanical pressure, and its density was 0.941 gram per cubic centimeter.

(B) The procedure of Example 5A was repeated, except that 1.29 ml. of triphenylsilane was substituted for the triethylaluminum therein described. No polymer was obtained.

(C) The procedure of Example 5A was repeated, except that 0.55 ml. of triethylaluminum and 0.43 ml. of triphenylsilane were substituted for the triethylaluminum therein described. The product polymer weighed 2.0 grams; its melting point was 155–290° C., and its density was 0.934 gram per cubic centimeter.

(D) The procedure of Example 5A was repeated except that 0.26 ml. of triethylaluminum and 0.87 ml. of triphenylsilane were substituted for the triethylaluminum therein described. The yield of product polymer was 2.1 g. The product had a melting point of 155–290° C. and a density of 0.939 g. per cc.

The ratios used in the foregoing Examples 2 to 5 are summarized hereinafter in Table 1. Only the ratios of parts A, C, and D are given for each example since the yields for part B in each example were substantially nil.

TABLE 1

| | Ti/Al+Si | Si/Al | Yield |
|---|---|---|---|
| Example 2: | | | |
| A | 1.01 | 0 | 15.9 |
| C | 1.06 | .45 | 16.0 |
| D | 1.09 | 1.73 | 31.1 |
| Example 3: | | | |
| A | 1.00 | 0 | 11.9 |
| C | 1.00 | .49 | 14.6 |
| D | 1.03 | 2.12 | 29.7 |
| Example 4: | | | |
| A | 1.00 | 0 | 26.8 |
| C | 1.54 | 1.07 | 27.5 |
| D | 1.02 | 2.13 | 41.4 |
| Example 5:[1] | | | |
| A | 1.06 | 0 | 1.4 |
| C | 1.09 | .78 | 2.0 |
| D | .95 | 3.26 | 2.1 |

[1] Vanadium used instead of titanium.

It will be evident that modifications of this invention can be made without departing from the spirit and scope of this disclosure or the scope of the following claims.

We claim:
1. In a process for the polymerization of olefins using a three-component Ziegler type catalyst system consisting of an organoaluminum component, an organosilane, and a metal halide, the improvement comprising substantially increasing the polymerization yield by using as said three components:
(a) as said organoaluminum component, a compound represented by the formula:

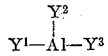

wherein $Y^1$, $Y^2$, and $Y^3$ are alkyl radicals having less than five carbons atoms,
(b) as said organosilane, an organosilane containing at least one silicon-hydrogen bond and selected from the group consisting of triethylsilane, triphenylsilane, diphenylsilane and tri-n-hexylsilane,
(c) as said metal halide, a member selected from the group consisting of $VCl_3$, $TiCl_3$ and $TiCl_4$;
wherein, in (a), (b) and (c), the ratio of the number of silicon atoms to the number of aluminum atoms is 0.78–3.26 when (c) is $VCl_3$ and 1.73–2.13 when (c) is $TiCl_3$ or $TiCl_4$ and the ratio of the number of vanadium or titanium atoms to the total number of aluminum and silicon atoms is 0.95–1.09 when (c) is $VCl_3$ and 1.02–1.09 when (c) is $TiCl_3$ or $TiCl_4$.

2. The process of claim 1 wherein the organoaluminum is triethylaluminum.

3. As a composition of matter, a catalyst consisting essentially of:
(a) an organoaluminum component represented by the formula:

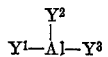

wherein $Y^1$, $Y^2$, and $Y^3$ are alkyl radicals having less than five carbon atoms,
(b) an organosilane component combining at least one silicon-hydrogen bond and selected from the group consisting of triethylsilane, triphenylsilane, diphenylsilane and tri-n-hexylsilane,
(c) a metal halide component selected from the group consisting of $VCl_3$, $TiCl_3$ and $TiCl_4$;

wherein, in (a), (b) and (c), the ratio of the number of silicon atoms to the number of aluminum atoms is 0.78–3.26 when (c) is $VCl_3$ and 1.73–2.13 when (c) is $TiCl_3$ or $TiCl_4$ and the ratio of the number of vanadium or titanium atoms to the total number of aluminum and silicon atoms is 0.95–1.09 when (c) is $VCl_3$ and 1.02–1.09 when (c) is $TiCl_3$ or $TiCl_4$.

4. The composition of claim 3 wherein the organoaluminum is triethylaluminum.

References Cited

UNITED STATES PATENTS

| | | | |
|---|---|---|---|
| 3,166,547 | 1/1965 | Loel | 260—94.9 |
| 3,173,901 | 3/1965 | Newberg et al. | 260—88.2 |
| 3,227,702 | 1/1966 | Small et al. | 260—94.9 |

FOREIGN PATENTS

| | | | |
|---|---|---|---|
| 1,016,512 | 1/1966 | Great Britain | 260—94.9E |

OTHER REFERENCES

Sorokin et al.: Chemical Abstracts, vol. 64, col. 19786h and 19787a (1966).

JAMES A. SEIDLECK, Primary Examiner

E. J. SMITH, Assistant Examiner

U.S. Cl. X.R.

252—429; 260—88.3, 89.1, 89.5, 91.1, 92.8, 93.1, 94.3, 94.9, 93.5